Aug. 13, 1929.   C. PARKER   1,724,773
APPARATUS FOR MAKING CHAIN
Filed Jan. 8, 1923   6 Sheets-Sheet 1

INVENTOR
*Charles Parker*
BY
*G. H. Braddock*
ATTORNEY

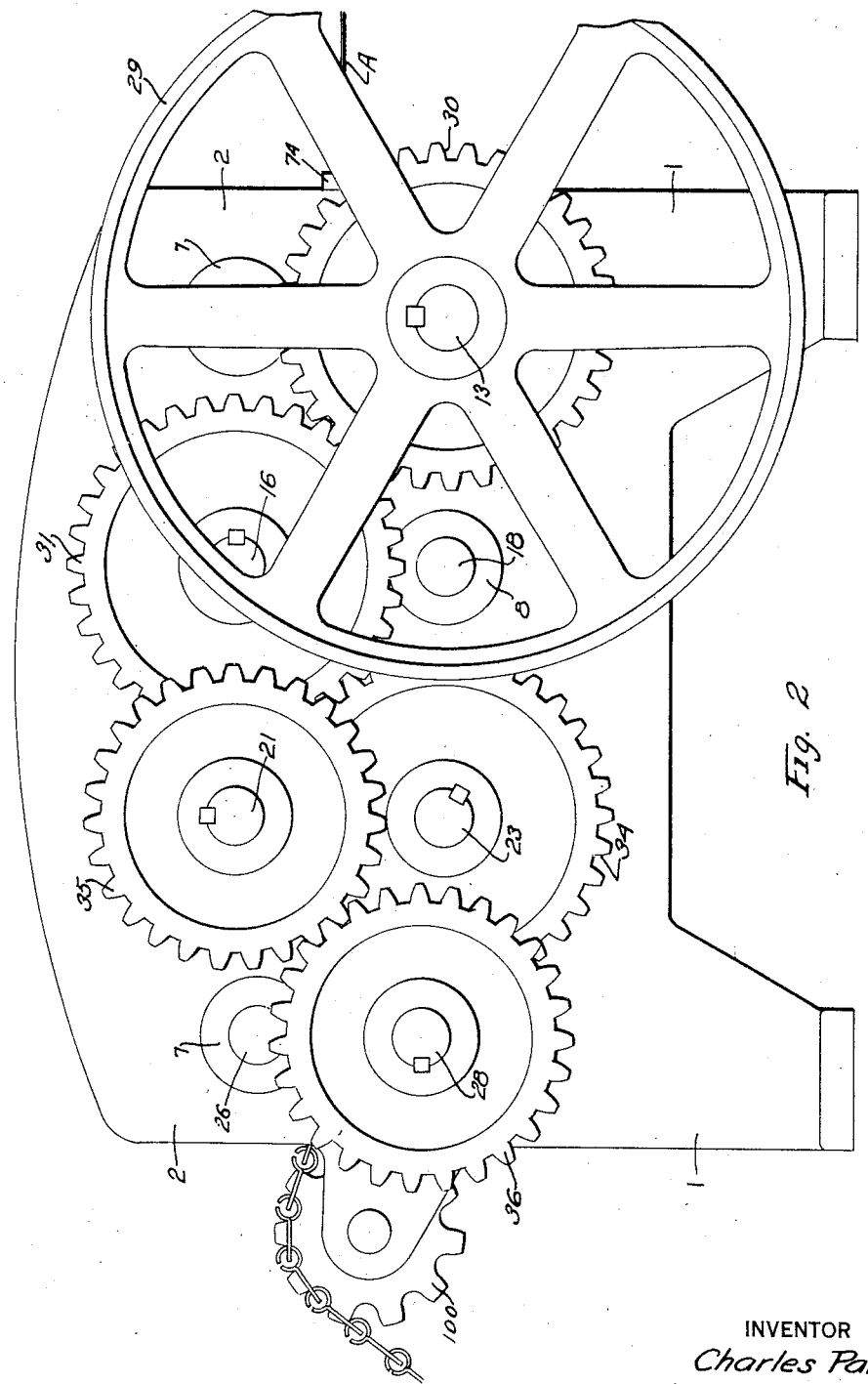

Aug. 13, 1929.　　　C. PARKER　　　1,724,773
APPARATUS FOR MAKING CHAIN
Filed Jan. 8, 1923　　6 Sheets-Sheet 3
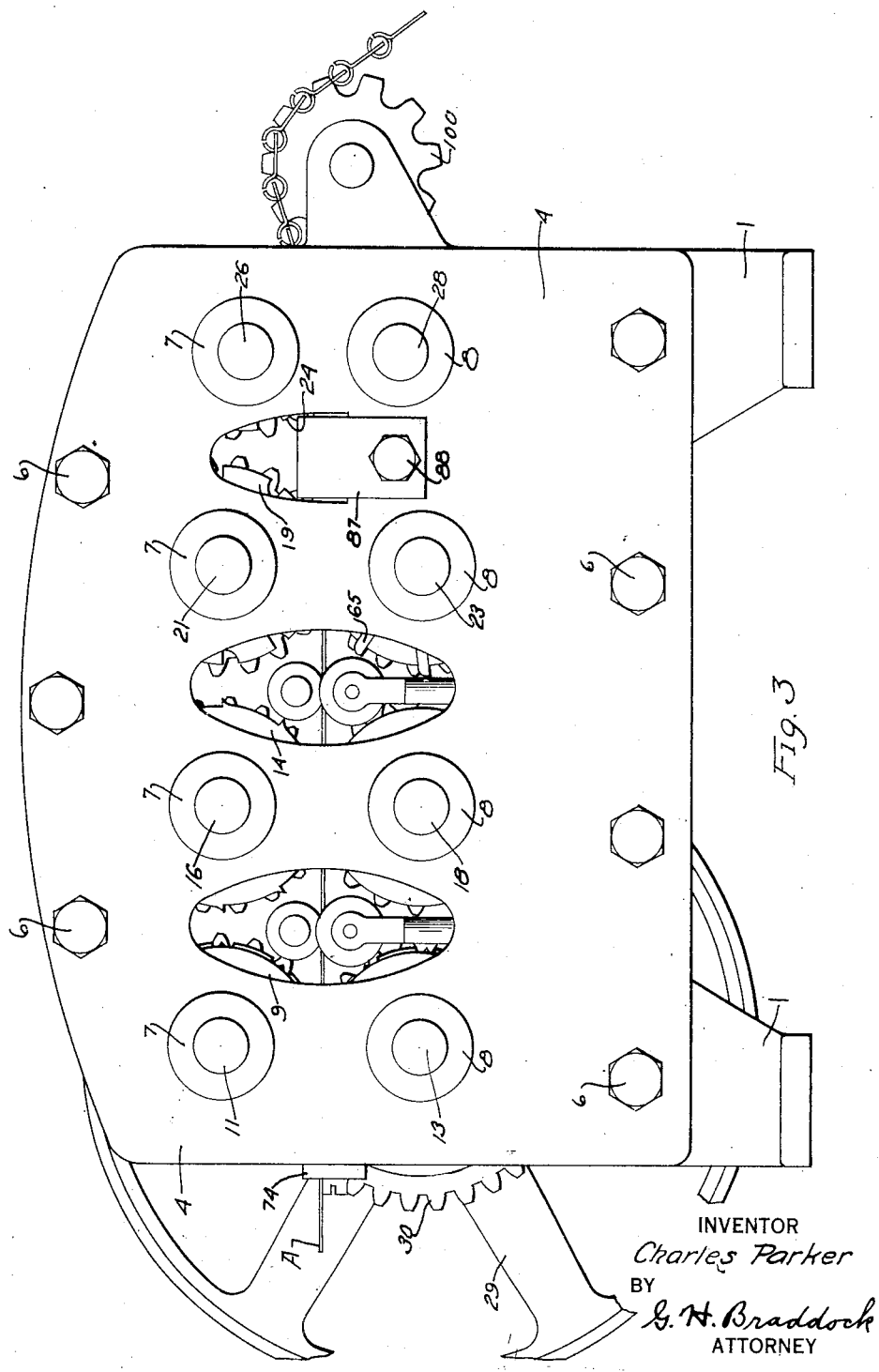
INVENTOR
Charles Parker
BY
G. H. Braddock
ATTORNEY

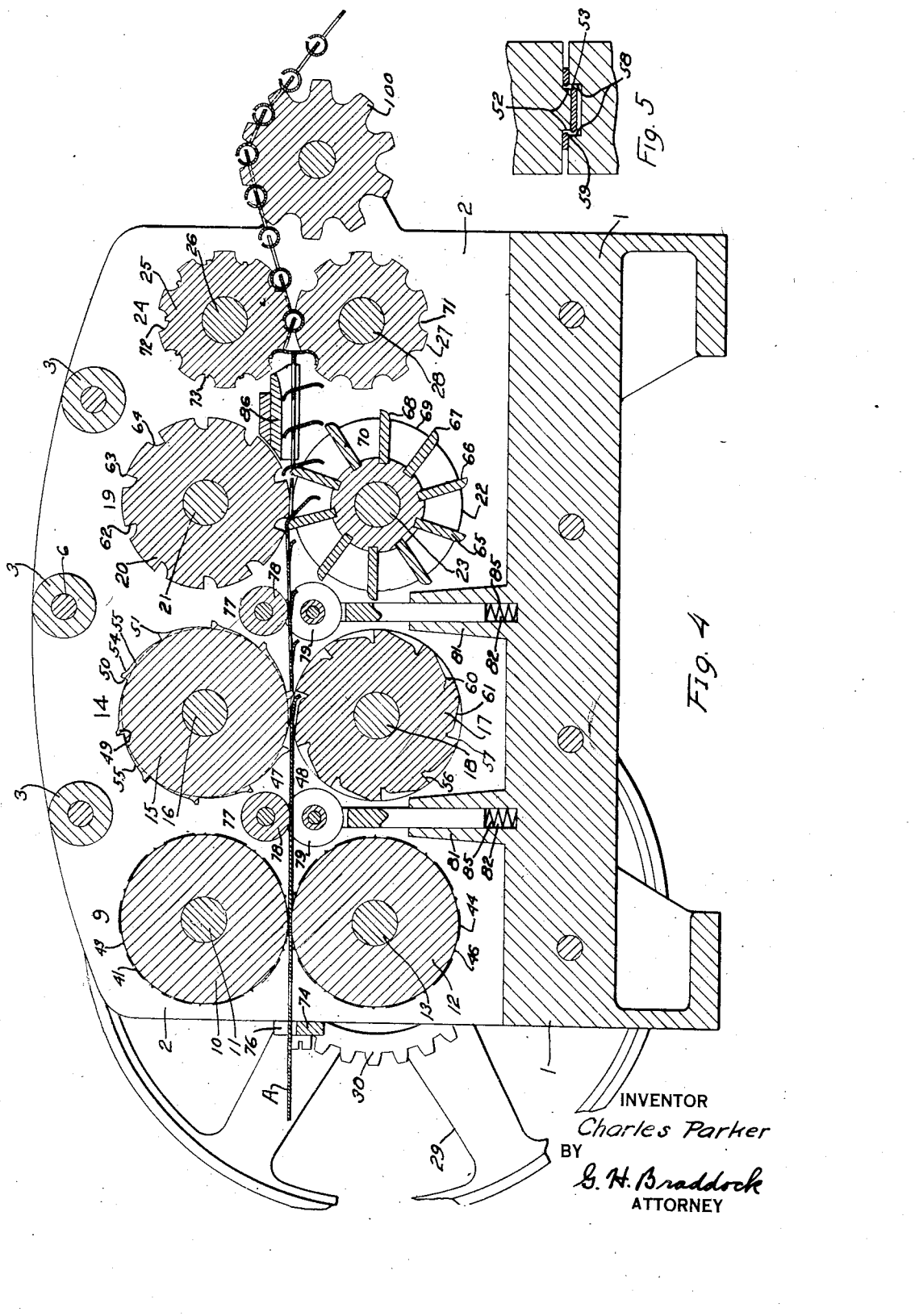

Aug. 13, 1929.　　　　C. PARKER　　　　1,724,773
APPARATUS FOR MAKING CHAIN
Filed Jan. 8, 1923　　6 Sheets-Sheet 5
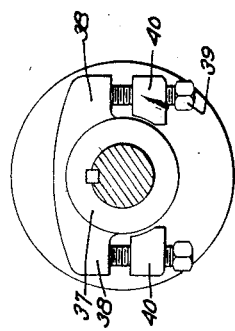
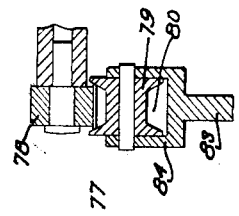
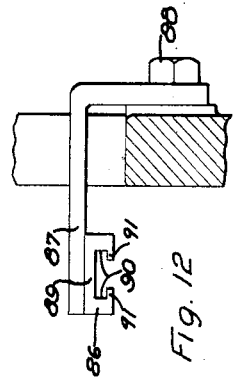
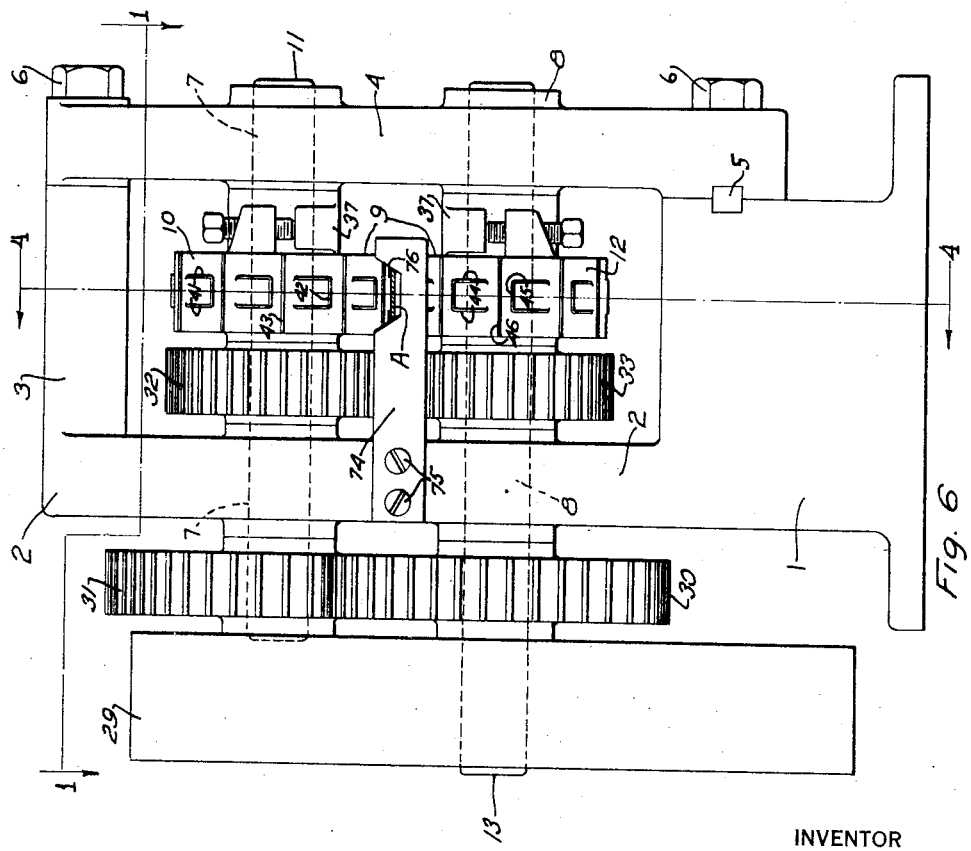
INVENTOR
*Charles Parker.*
BY
*G. H. Braddock*
ATTORNEY Aug. 13, 1929.　　　　C. PARKER　　　　1,724,773
APPARATUS FOR MAKING CHAIN
Filed Jan. 8, 1923　　　6 Sheets-Sheet 6
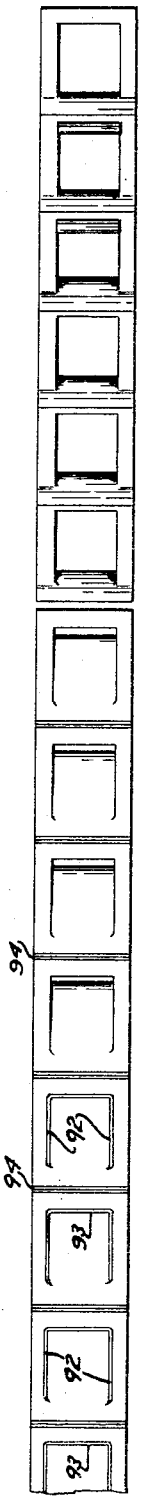
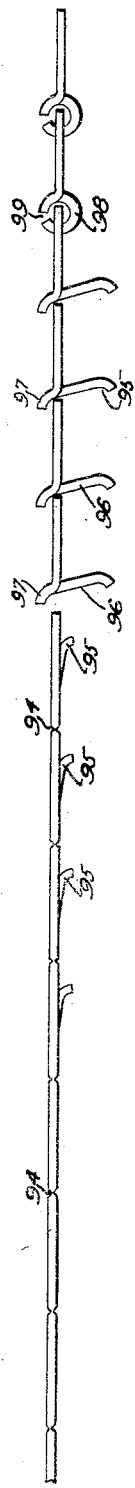
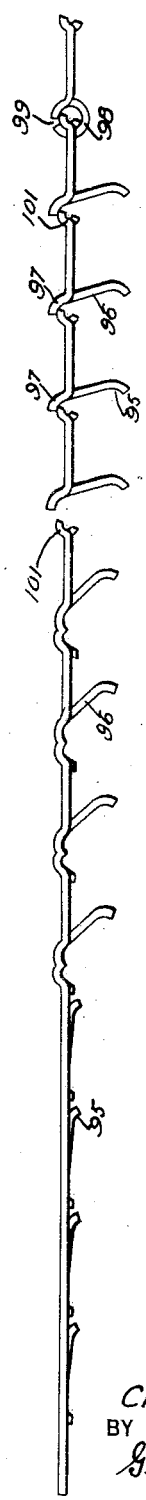
INVENTOR
*Charles Parker.*
BY
*G. H. Braddock*
ATTORNEY Patented Aug. 13, 1929.

1,724,773

UNITED STATES PATENT OFFICE.

CHARLES PARKER, OF BRIDGEPORT, CONNECTICUT, ASSIGNOR TO THE LOCKE STEEL CHAIN COMPANY, OF BRIDGEPORT, CONNECTICUT, A CORPORATION OF CONNECTICUT.

APPARATUS FOR MAKING CHAIN.

Application filed January 8, 1923. Serial No. 611,479.

This invention relates to an apparatus for and a process of making chain links and assembling the same, and has more especial reference to an apparatus and a process for operating upon a strip of metal while the same is continuously fed to transform the strip into connected chain links.

Chain links have been formed and assembled by utilization of various combinations of dies (mostly reciprocatory and stationary dies) designed to move relatively to each other, but, so far as I am aware, chain links have not heretofore been formed and assembled by utilization of dies the working elements of which have forward motion with a strip of metal, in addition to their motions necessary to accomplish transformation of the strip into connected chain links.

It is an important object of this invention to provide an apparatus for and a process of successively transforming strip metal into connected chain links wherein the operations upon the strip are performed concurrently with the feeding thereof, whereby production of chain can be more rapid.

It is a further important object of the invention to provide an apparatus for and a process of making chain wherein the working elements have forward motion with a strip of metal, as well as the motions necessary to transform the strip into connected chain links.

Another important object of the invention is to provide an apparatus for and a process of making chain links which contemplate the employment of a plurality of different sets of working elements adapted to perform step by step operations upon metal stock to transform the same into links concurrently with the feeding of the stock past said different sets of working elements.

Another important object of the invention is to provide an apparatus for and a process of making chain wherein the different forming elements are carried by separate pressure producing elements to reduce the load on the pressure producing elements and greatly reduce their size.

Another important object of the invention is to provide an apparatus for and a process of making chain wherein the preliminary scoring, shearing and forming operations are performed by working elements which move uniformly and gradually toward and into the stock whereby the work in each operation is done gradually and with little pressure instead of at once and by heavy pressure, as with flat reciprocating dies.

Another important object of the invention is to provide an apparatus for making chain links and assembling them wherein no feed mechanism other than the working elements or dies themselves is required, whereby waste at the end of the coils is greatly reduced, said elements and dies accounting for the feeding of the metal strip, as well as for the feeding of the finished chain out of the machine, and the feeding of the severed links between the strip and chain.

And a further important object of the invention is to provide a novel mechanism and arrangement for insuring that the strip metal will align with the working elements of the machine.

Other objects and advantages will become apparent from the drawings and description of construction and operation of a machine embodying the invention herein selected for the purpose of illustration.

Fig. 2 is an elevational view of the machine of Fig. 1, looking at the drive side thereof;

Fig. 3 is an elevational view looking at the opposite side;

Fig. 4 is a longitudinal sectional view on line 4—4 in Fig. 6;

Fig. 5 is an enlarged fragmentary sectional view detailing the working elements of the second set of rolls;

Fig. 6 is an end view of the machine;

Fig. 7 is an enlarged plan view of a strip of metal in process of formation into chain, some severed links and some formed and coupled links being shown;

Fig. 8 is an edge view of the metal strip, severed links and chain shown in Fig. 7;

Fig. 9 is an edge view, corresponding with the showing of Fig. 8, suggesting a manner in which a modified form of chain can be made upon a variant form of machine embodying the features of the invention;

Fig. 10 is a detail of mechanism whereby each rotatable die can be adjustably fastened on its axis, to be slightly advanced or retarded to synchronize with the operations performed by the other rotatable dies;

Fig. 11 is a detail of mechanism for assisting in the guiding of the strip; and

Fig. 12 is a detail of the receiving guide for the severed blanks.

Figure 1:
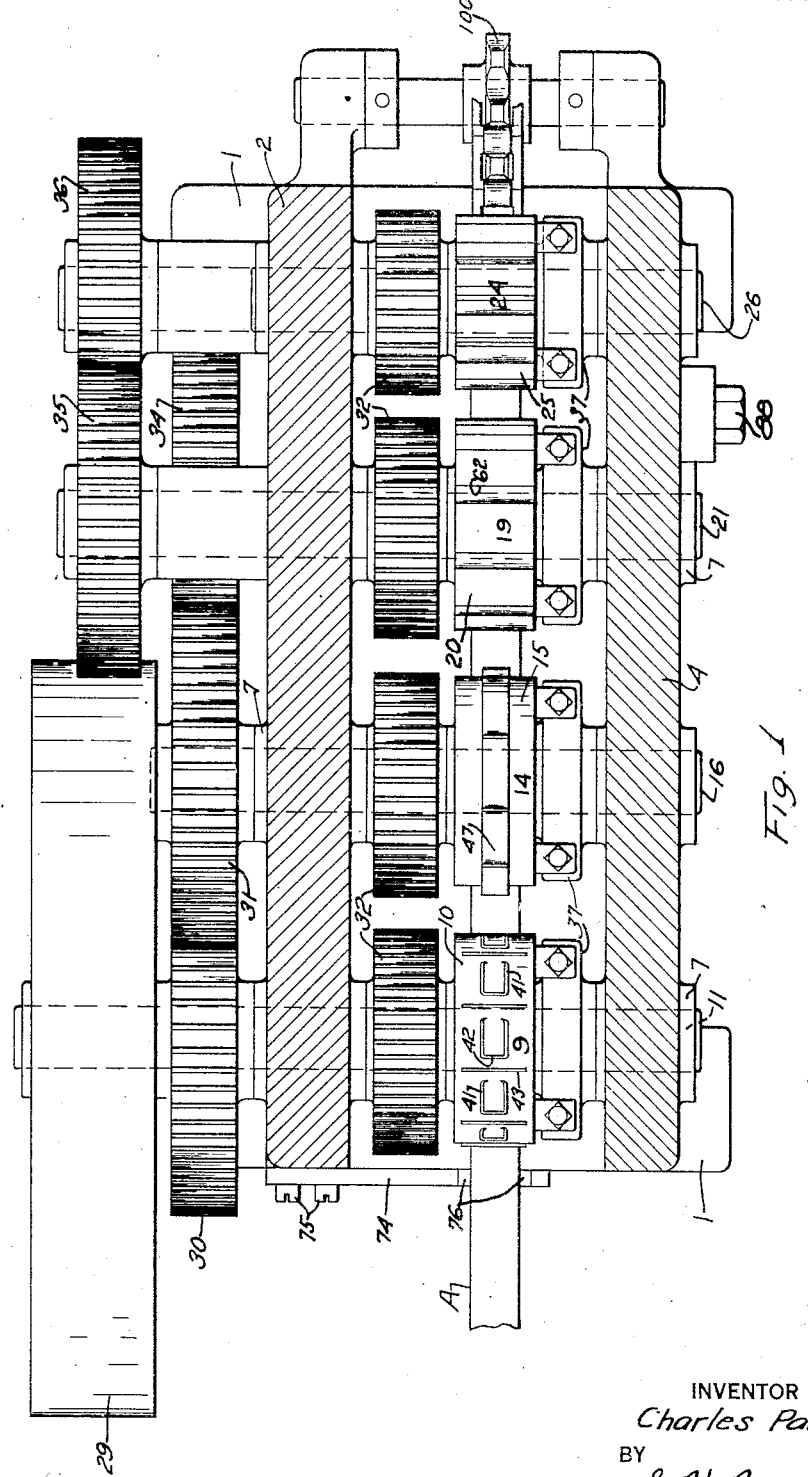
Fig. 1 is a sectional view, on line 1—1 in Fig. 6 of a machine illustrating one way of carrying out the invention, the improved apparatus being incorporated in the machine.

In the drawings, 1 indicates the base of the machine, 2 a vertical upright integral with the base and extending the length thereof, 3 horizontal extensions of the upper portion of the upright 2 lying directly above the base, and 4 indicates a vertical upright, spaced from upright 2, detachably secured to the base 1 and extensions 3, numeral 5 (Fig. 6) suggesting a machined key-way for accurately locating the upright 4. As shown, the base 1, upright 2, and extensions 3 are constituted by a casting, the upright 4 consisting of a different casting bolted as at 6 to the base and extensions. The uprights or their equivalents could be provided in any other suitable manner.

The machine includes oppositely disposed, forwardly driven rolls, there being an upper roll and a lower roll for each operation, or segregated series of operations, required to produce chain, and the rolls are arranged so that all of the operations will synchronize.

7 represents upper rows of bushings in the uprights 2 and 4, respectively, one row in each upright, the corresponding bushings in each row being arranged directly opposite each other in the same horizontal plane, and 8 represents lower rows of bushings, one row in each upright, corresponding bushings in each row being similarly arranged. The bushings provide bearings for the shafts of the rolls or rotatable dies.

As shown, there are four sets of rolls or rotatable dies, one set for each operation (or segregated series of operations) to be performed in the machine, and the upper rotatable dies and lower rotatable dies, respectively, are located with respect to each other to position in a single horizontal plane the whole length of the strip metal and severed links being operated upon. The upper and lower rotatable dies of a set have proper relation to best perform their intended functions. It is to be understood that a greater or less number of sets of dies can be utilized without departing from the spirit of the invention.

There is a rearward set of rolls or rotatable dies, 9, for the first operation (or series of segregated operations) in the machine, including an upper rotatable die 10 upon shaft 11 in bushings 7, and a lower, oppositely disposed rotatable die 12 upon shaft 13 in bushings 8. These dies preferably include in their structure the forming tools for completely outlining the individual links of the chain to be produced.

The second set of rolls 14, for the second operation (or series of segregated operations), includes oppositely disposed upper rotatable die 15 upon shaft 16 and lower rotatable die 17 upon shaft 18. These dies preferably include in their structure the forming tools for severing and crimping the central portion or long lip of the link blank to be employed in forming the large end or sprocket bar of the link.

The third set of rolls 19, for the third operation (or series of segregated operations), includes oppositely disposed upper rotatable die 20 upon shaft 21 and lower rotatable die 22 upon shaft 23. These dies preferably include in their structure the severing and forming tools for severing the link from the strip and for simultaneously throwing the shot lip of the sprocket bar of the link upwardly and the long lip thereof downwardly, in order that the end hook will be in its final forming and assembling position.

The last set of rolls 24, for the last operation (or series of segregated operations), includes oppositely disposed upper rotatable die 25 upon shaft 26 and lower rotatable die 27 upon shaft 28. These dies preferably include in their structure the final end hook shaping and link assembling tools.

The rotatable dies may be driven forwardly in any manner, as by a belt pulley 29 fixed upon the shaft 13, the pulley rotating in the direction indicated in the drawing. As shown, the rotation of the dies is accomplished and synchronized by means of a train of gears, there being a gear 30 fixed upon shaft 13 and meshing with a gear 31 upon shaft 16 to accomplish forward feeding of the first two sets of rolls. Smaller gears 32, one upon each shaft of the upper rotatable dies, mesh with similar gears 33, one upon each shaft of the lower rotatable dies, in the instance of each set of rolls, to insure the proper relative rotating arrangement of the dies of a set, and the remainder of the gear train for driving the rotatable dies may be as follows: The gear 31 meshes with a gear 34 upon the shaft 23 of the lower die 22 to rotate the third set of rolls, as well as the shaft 21 of the upper die 20, and a gear 35 upon this last mentioned shaft meshes with a gear 36 upon the shaft 28 of the lower die 27 of the last set of rolls, thus imparting movement of rotation to the last set.

The rotatable dies can be fixed against longitudinal movement on their axes (between the uprights 2 and 4) in any suitable manner, to insure that all of the rotatable dies will be in aligning relation, and the dies can be adjustably fastened to their axes, to be advanced or retarded to synchronize the operations upon the machine, as by drivers 37 keyed upon the shafts of the rotatable dies and having extensions 38 supplying stops for adjustable set screws 39 in lugs 40 rigid with the rotatable dies, the rotatable dies being locked against rotation upon the shafts by the engagement of the set screws with the extensions.

Each rotatable die contains a plurality of duplicate chain forming elements, and the tools of the elements of the opposite dies of each set of rolls are complements of each other, there being as many elements upon each lower die as there are elements upon the upper die opposite it, and the elements of the upper die and lower die of a set are correspondingly arranged about the circumferences or peripheral margins of the dies to cooperate with each other in performing the particular work to be performed. The word "element" as herein used refers to a tool (or segregated series of tools) of a die to cooperate with a duplicate or complemental tool (or segregated series of tools) of an oppositely arranged die in performing a working operation (or segregated series of operations) in the machine.

As before mentioned, the rearward or first set of dies, to accomplish the first operation (or series of segregated operations) in the machine, may include the forming tools for completely outlining the individual links of the chain to be produced.

41 are scoring knives of the duplicate elements arranged upon the upper die 10 of the first set of rolls adapted to impart lines of score to the upper surface of a strip of metal, which lines are parallel in the direction of the feed of the strip with the exception of a slight divergence at their rearward ends, this divergence from parallelism being for the purpose of ready assembling of the links, as will become obvious. 42 is a scoring knife of each element of the upper die 10 adapted to impart lines of score at right angles to the lines imparted by the scoring knives 41, this scoring knife 42 being situated at the rearward ends of the scoring knives 41. 43 is a scoring knife of the duplicate elements of the upper die 10 adapted to impart a transverse score to the strip of metal along the line of severance of two links which are to adjoin each other.

44 are scoring knives of the duplicate elements upon the lower die 12 corresponding with the scoring knives 41 and arranged to impart lines of score to the under surface of the strip of metal, each of which lines is directly beneath a line of score imparted by one of the upper scoring knives 41. 45 is a scoring knife of each element of the lower die 12, corresponding with the scoring knives 42, to impart its line of score directly beneath a line of score of a knife 42. 46 is a scoring knife of the duplicate elements of the lower die 12 adapted to impart its line of score directly beneath a line of score of a transverse knife 43.

The second set of dies, to accomplish the second operation (or series of segregated operations), may include the working tools for severing and crimping the central portion or long lip of the link blank to be employed in forming the large end or sprocket bar of the link.

47 represents each of the severing and crimping elements of the upper die 15 of the second set of rolls, and 48 represents each of the complemental severing and crimping elements of the lower die 17 of said second set. The elements 47 and 48 are essentially for the purpose of breaking through the metal on the lines of score made by the knives 41, 44, and 42, 45. As shown, each element 47 includes a severing and crimping punch 49 having a forward radial face 50 defining a transverse cutting edge 51 and parallel side faces 52, perpendicular to the axis of the die 15, defining spaced apart cutting edges 53 perpendicular to the cutting edge 51. The working face of the punch 49 is of a configuration to provide a concave crimping surface 54 directly to the rear of the cutting edge 51, which concave crimping surface merges into a preferably slightly curved taper 55, itself merging into the peripheral face of the die 15. Each element 48 is constituted by a depression in the peripheral face of the die 17 to receive the severing and crimping punch 49. The forward portion of the depression is defined by a radial face 56 providing a transverse cutting edge 57 to cooperate with the cutting edge 51 in severing the stock along the line of score made by the scoring knives 42 and 45, and to the rear of said radial face 56 the depression has parallel side walls 58, perpendicular to the axis of the die 17, defining spaced apart cutting edges 59 perpendicular to the cutting edge 57. The cutting edges 53 and 59 cooperate in severing the stock along the lines of score made by the scoring knives 41 and 44. 60 is a convex crimping surface in the inner wall of the depression constituting the element 48, to cooperate with the concave crimping surfaces 54 of the severing and crimping punch in crimping the free end portion of the stock severed along the lines of score 41, 44 and 42, 45, and to the rear of the convex crimping surface 60 the inner wall of the depression may be cut away as at 61 to offer no interference to the action of the severing punch, which action is, in addition to the severing and crimping of the stock, to displace the full length of the severed stock downwardly slightly below the plane of the strip of metal.

Clearly, two or more sets of die elements may be substituted for the upper and lower duplicate elements for performing the second operation (or operations), as well as for the duplicate elements of each set for performing the other operations, the substitution of additional sets requiring the utilization of additional sets of tools to accomplish the ultimate result with a plurality of sets instead of with one set as shown: that is, to have in the machine more than four stations of operation as illustrated.

The third set of dies, to accomplish the third operation (or series of segregated operations), may include the working tools for severing the link blanks from the strip and for simultaneously throwing the short, wide lip for the large end or sprocket bar of each link blank upwardly and the long, narrow lip for said end bar downwardly, in order that the long lip or end hook of each blank will be in its final forming and assembling position.

Each of the elements of the upper die 20 of the third set of rolls includes a radial face 62 defining transverse cutting edge 63, there being a curvilinear surface 64, preferably on the arc of a circle, in advance of said radial face 62, and each of the elements of the lower die 22 of said third set includes a severing knife or punch 65 with radial face 66 defining cutting edge 67 complemental to cutting edge 63. The punch has a convex crimping surface 68 in advance of the cutting edge 67 and complemental to the curvilinear surface 64 to cooperate with said surface in forming the short, wide lip of the large end which is to constitute the sprocket bar of the link. As disclosed, the lower die 22 includes circular, spaced apart flanges 69 providing a space 70 between the flanges of slightly greater width than the width of the long narrow lip for the large end bar of the link. The peripheral surfaces of these flanges are constructed to engage the side bars of a link blank as the same passes between the rolls of the third set, to cooperate with the upper die 20 in insuring forward, horizontal feeding of the link. The combined action of the cutting edges 63 and 67 is to sever the stock along the lines of score made by the scoring knives 43 and 46, while the action of the upper and lower forming elements in shaping the short, wide lip, of the large end upwardly is to throw the narrow lip of said large end or sprocket bar downwardly in a circle into the space 70 between the flanges 69.

The assembling elements may be on the last set of rolls. The lower die 27 of the last set has elements each of which includes a part circle surface 71, preferably slightly less than a half-circle, and the upper die 25 of this set has similar, complemental elements each including a part-circle surface 72 with spacing mandrel 73 arranged transversely of the die to define a quarter-circle arc at the forward portion of the part-circle surface 72, the spacing mandrel being for the purposes of providing the detaching slot present in the finished chain and for locating the short, wide lip of the large end bar of the link in said part-circle surface 72. Obviously, the part-circle surfaces 71 and 72 are complemental, their combined action serving to roll the long lip or end hook to circular form.

Mechanism is provided for guiding a strip of metal, as well as detached, unfinished blanks, between the rolls of the different sets.

Of this mechanism, 74 denotes a strip gage arranged transversely just in advance of the first set of rolls for centering the metal strip with respect to the dies, the gage being secured upon upright 2 as at 75. It consists of a bar of metal the top of which is cut to provide a V-shaped groove 76 with the axis of the V in the vertical central longitudinal plane of the dies. The walls of the V-shaped groove are preferably elevated somewhat above the horizontal plane of the line of feed and the taper of the gage allows for variation in width of the strip of metal to insure its proper centering despite its variations in width.

77 denotes, generally, a different form of gage, between the first and second and second and third sets of rolls. Each gage 77 consists of a cylindrical roller 78, supported on the frame in any manner just above the line of feed of the strip of metal, and a roller 79 below the strip having a V-shaped groove 80, adapted to function in the general manner of the V groove 76, to center the strip. The V-groove 80 is constructed to allow clearance for passage of the strip, even though partially formed, as when passing from the second to the third set of rolls. See Fig. 11. 81 denotes projections on the base of the machine each with opening 82 slidably receiving a shank 83 with fork 84 by which the V roller 79 is rotatably supported. 85 is a coil spring between the shank and the end of each opening. Obviously, the coil spring provides for a resilient engagement of the taper walls of the V roller with the strip, and the cylindrical roller and V roller cooperate to better accomplish the guiding.

86 is a blank receiving guide to receive the severed link blanks as they pass beyond the third set of rolls. The construction of this guide will be clear from Figs. 4 and 12. 87 is an L-shaped bracket secured upon the machine frame as at 88. The blank receiving guide is supported by this L-shaped bracket and includes a top wall 89, side walls 90 spaced apart a distance to allow ready passage of the severed link blank, and overhanging walls 91 for insuring that the body of the blank cannot become displaced from the receiving guide, the overhanging walls being spaced at sufficient distance apart to allow ready passage of the downwardly extending stock to form the long, narrow lip of the link for providing the large end bar thereof. The overhanging and side walls as shown extend a slight distance beyond the end of the top wall of the blank receiving guide in the direction of the fourth set of rolls, and said top wall is desirably shaped at its forward end to best guide the short, wide lip of the link blank to the portion of the part-circle surface 72 in front of the mandrel 73.

The operation of the machine will be readily understood. A strip of metal A is guided between the rearward or first set of rolls and power is applied to rotate all of the rolls so that the strip is continuously fed forwardly. The strip is guided and centered by all of the gages so as to lie properly between all of the sets of rolls. A section of metal which is to form a link blank is first acted upon by the scoring knives 41 44, 42 45, and 43 46, to score the upper and lower surfaces of the stock along the lines 92, 93, and 94, respectively, to thus completely outline the blank. Thence the section outlined for the blank passes beyond the rearward rolls and the succeeding scoring knives of the first set move forwardly and vertically, uniformly and gradually, into the forwardly moving stock to repeat the outlining operation just described.

Eventually, the link blanks pass successively between each set of rolls, and the upper and lower dies of each other set cause the working elements to move toward and with the strip of metal in the same general manner as do the upper and lower dies of the rearward set of rolls.

The action of the severing and crimping elements of the upper and lower dies of the second set of rolls is to sever the stock along the lines of score 92 and 93; to crimp the free end portion of this severed stock; and to displace the full length of the severed stock downwardly slightly below the plane of the strip of metal. The knife edges 51 and 57 cooperate to sever the stock. The concave crimping surface 54 and convex crimping surface 60 cooperate to crimp the free end of the stock severed as denoted at 95; and the taper surface 55 of the severing and crimping punch displaces the severed stock downwardly. This severed stock is to provide the long, narrow lip of the link blank, as denoted at 96 and the crimping tools are designed to impart to the free end of the long, narrow lip a curvilinear or quarter-circle configuration in order that the long lip can be rolled by the link assembling elements to true circular form. It will be apparent from Fig. 5 that the peripheral faces of the dies 15 and 17 themselves are in engagement with the upper and lower faces of the metal of the strip constituting the side bars of the link blanks while the severing and crimping elements of said dies 15 and 17 are operating.

The action of the upper and lower dies of the third set of rolls is to sever the stock along the line of score 94 and to shape the long, narrow lip of the link blank which is to be employed in forming the sprocket bar into its final forming and assembling position. The knife edges 63 and 67 cooperate to sever the sections, and the convex crimping surface 68 and curvilinear surface 64 cooperate in shaping the short, wide lip of the link blank to have curvilinear or quarter-circle configuration required for true circular rolling of the sprocket bar. The combined action of the surfaces 68 and 64 is to throw the short, wide lip, denoted 97 upwardly in a circle, as well as to crimp said short, wide lip. Naturally, the long, narrow lip having been previously severed from the side bars and small end bar of the link, the action which throws the short, wide lip upwardly, throws the long, narrow lip downwardly in a circle to locate the end hook or long lip in position to be operated upon by the assembling elements. The flanges 69 cooperate with the peripheral surface of the die 20 in feeding the link blank horizontally forwardly while the short, wide lip is being operated upon by the link severing elements, and the spaces 70 between the flanges allow ready passage of the long lip beyond the die 22.

The action of the upper and lower dies of the last set of rolls is to finally shape the end hook or long lip around the short end bar of the preceding severed link blank. Previous to reaching the final set of rolls, the free ends of the short, wide lip and long, narrow lip for the large end bar of the link have been properly crimped to assist rolling of the sprocket bar to circular form, as denoted at 98 and the part-circle surfaces of the upper and lower dies of the final set, including the transversely arranged mandrel in one of said part-circle surfaces, defining the detaching slot 99 in the finished chain, nicely cooperate to provide a cylindrical sprocket bar. Evidently, the rolls of the last set must be smaller than the other rolls if rotated at the same speed, and the space allowed between the third and fourth sets of rolls must take into consideration the slightly shorter severed links, shortened by reason of the shaping of the wide lip 97.

All of the forming, severing and assembling elements have forward motion with the strip of metal, as well as vertical motion. It is this forward motion of the elements with the strip that makes possible the transformation of the metal into connected chain links while being fed.

A rotatable die of the present machine may have any preferred number of duplicate working elements. As disclosed, several link blanks are at all times on their way from one set of rolls to the next during the operation of the machine, and the first three sets of rolls serve to feed the strip of metal forwardly, although the strip could be fed in some other manner (not shown). As the working faces or elements of the oppositely disposed dies of the different sets of rolls are all located to position the whole length of strip metal in a horizontal plane, the fact that several link blanks are always traveling from one set of rolls to the next is no detriment to the feeding of the strip metal by the sets of rolls, especially when the gages 77, between the first and second, and second and third sets, are employed. However, a special device is required to guide the severed blanks from the third to the fourth, or assembling, set of rolls, and the severed blanks must be fed from the third to the fourth set in a manner different from the manner of feed of the strip from the first to the third set of rolls. The blank receiving guide constitutes this device, and the link severing punch feeds the severed blanks through the receiving guide, to the assembling rolls. After a section is severed, the convex crimping surface 68 of the blank severing knife 65 pushes as it rotates forwardly, against the rear end of the severed link blank to force the front end thereof against the rear end of the next preceding link blank. Before a severed link blank has left the third set of rolls, the forward end of the blank has been pushed into the blank receiving guide 86, the overhanging walls 91 of the guide, in fact, being capable of assisting the flanges 69 and die 20 in the horizontal feeding of the link blank against the action of the short, wide lip shaping elements tending to rotate the blank. The severing knives 65, forcing each blank ahead as soon as severed, feed the severed blanks through the receiving guide and to the assembling elements.

The forward end of the blank receiving guide is sufficiently close to the dies of the last set of rolls so that the short, wide lip and long, narrow lip to provide the sprocket bar will be positioned in the part-circle surfaces of the upper and lower dies, respectively. As shown, the free end or crimped portion of the long lip first contacts with the die 27 and the receiving guide allows a lifting movement of the end hook to the die 25, whereby the part circle surfaces can best cooperate to turn the long lip to circular form about the small end bar or pintle of the preceding link. The arrangement of the spacing mandrel on the part-circle surface of the upper die of the last set is such that the short, wide lip of the end hook can position in front of said mandrel, the blank receiving device cooperating in the guiding of the wide lip, as shown.

100 is an idler over which the finished chain can be guided in order that the spacing mandrel can naturally recede from the detaching slot of the sprocket bar which it defines.

It is to be noted that the only feed necessary on the machine is the working elements and dies themselves, although the feeding could be accomplished otherwise. The elements of the first three sets of rolls cooperate to feed the strip of metal; the severing knives and dies of the third set of rolls feed the severed blanks and force them to be pushed, one by the other, into the assembling elements of the final set of rolls; and the assembling elements feed the finished chain out of the machine to the idler sprocket.

The advantage of having the link blank outlined by the first set of rolls is obvious. The machine is thus simplified and the difficulty of timing a plurality of sets of rolls to make the parts of the links uniform is eliminated.

The operations in the present machine, as compared with similar operations in certain machines, utilizing reciprocating dies heretofore known, are reversed, that is, changed end for end, but the sequence of operations is the same as for reciprocating dies. This accomplishes three results: (1) When the long or hook lip of the sprocket bar has been turned down by the action of the cut off knife and the rolls continue their rotation, this long lip is moving away from and not toward the base of the cut off knife. Otherwise the knife would have to be under cut or the long lip would be bent. (2) In the closing rolls the short lip of the sprocket bar positions naturally into any part of the quarter-circle in front of the approaching slot spacing mandrel when the blank is pushed out of the line of the strip by contact of the long lip with the other finishing roll. If the links were reversed it would be difficult to position the lip back of the mandrel as it would be likely to position in front or on top of the mandrel. (3) The hook is rolled up toward the wide part of a convergent pair of jaws which is easier and gives less friction than would be the case if rolled toward the narrow end of the jaws.

In the present machine the link is cut from the strip before closing the hook. This accomplishes three results: (1) The closing dies have a rolling motion as well as the vertical motion found in reciprocating dies which would necessitate the turning of the whole sprocket bar in the closing dies if the small end of the link were not free to swing in a circle about the closing die which carries the short lip. (2) The above condition permits of the use of a spacing mandrel for regulating the detaching slot and permits sufficient pressure on the sprocket bar to insure its being round. (3) The blanks can be pushed together so that the hook is rolled around the small end of the next link and assembling accomplished without further mechanism.

In Fig. 9, I have suggested the making of a variant form of chain by the utilization of a machine wherein the sets of rolls are of modified form. To make the chain shown I would preferably utilize five sets of rolls instead of four, particularly to care for the shaping of the short end bar or lip 101 of the link of said chain.

Many alterations in the construction and many apparently widely differing embodiments and applications of the invention will suggest themselves to those skilled in the art of making sheet metal chain links and chain making machines without departing from the scope and spirit thereof. The disclosures and description herein are purely illustrative, and are not intended to be in any sense limiting.

What I claim is—

1. In a machine for making chain from a strip of metal, oppositely disposed working elements, means for feeding the strip between and over said working elements, means for moving said elements toward, into and forwardly with said strip to transform the same into a partially completed link, other oppositely disposed working elements, the strip feeding means being adapted to carry said partially completed link between said other elements, means for moving said other elements toward and forwardly with said partially completed link to sever the same from the strip and to shape the partially completed link as severed, means for feeding the partially completed link, oppositely disposed assembling elements, and means for moving said assembling elements toward and with said partially completed link to connect the same with a following partially completed link of the chain being made.

2. In a machine for making chain from a strip of metal, means for feeding the strip, oppositely disposed working elements adapted to move toward, into and forwardly with the strip to transform the same into a partially completed link, other oppositely disposed working elements adapted to move toward and into and forwardly with the strip to sever the partially completed link from the strip and to perform shaping operations upon the partially completed link, means for feeding the severed link, oppositely disposed assembling elements adapted to move toward and forwardly with the partially completed link to connect the same with a following partially formed link of the chain being made, and means for guiding the strip and severed links through the machine.

3. In a machine for making a chain link from a section of sheet metal, means for feeding the section forwardly, oppositely disposed working elements adapted to move forwardly with the section of metal and to first impart lines of score thereto outlining the link, and means for feeding said section of metal further forwardly and for performing severing operations along said lines of score and shaping operations upon said section.

4. In a machine for making a chain link from a section of sheet metal, the link having side bars, a relatively small end bar, and a relatively large end bar or end hook constituted by a long, narrow lip and a short, wide lip, means for feeding the section forwardly, means for imparting lines of score to the section to completely outline the blank, means for severing the metal along the scored lines at the center of the blank defining the long, narrow lip of the large end bar or end hook of the blank and for crimping the end of said long, narrow lip, means for severing the blank from the section along the scored lines defining the ends of the blank and for crimping the short, wide lip of the large end bar or end hook and for shaping said large end bar or end hook for its rolling operation, and means for finally rolling said large end bar or end hook to circular form, all of the forming, severing and assembling means having forward movement with the section of metal.

5. In a machine for making chain from a strip of metal, a plurality of spaced apart link forming dies over which said strip is adapted to pass, and a strip gage interposed between said dies for the purpose described.

6. In a machine of the character described, a gage for a strip of metal, comprising a roller adapted to engage one face of said strip, a V-roller adapted to engage the other face of said strip, and means whereby one of said rollers can have resilient engagement with the strip.

7. In a machine of the character described, a link blank severing and shaping element, a blank receiving guide adjacent said severing and shaping element, an assembling element adjacent said blank receiving guide, and means associated with said severing and shaping element for feeding link blanks, one by the other, through said receiving guide and to said assembling element.

8. In a machine for making chain from a strip of metal, a plurality of sets of oppositely disposed working elements for transforming the strip into partially completed links, a set of oppositely disposed working elements for severing the partially completed links from the strip as formed, a blank receiving guide adjacent the last mentioned set of working elements, a set of oppositely disposed assembling elements adjacent said guide, and means whereby the severed, partially completed blanks can be fed, one by the other, from the severing elements to the assembling elements.

9. In a machine for converting a strip of metal into a chain, each link of which comprises a hook at one end and an end bar at the other end, the hook on one link receiving the end bar on the adjacent link, means for feeding the strip through the machine, means for forming a link from the strip with the hook open and with the open part thereof facing in the direction from which the strip is being fed, and a rotating die and means moving in cooperation therewith adapted to fold said hook over the end bar of the following link.

10. In a machine for converting a strip of metal into a chain, each link of which comprises a hook at one end and an end bar at the other end, the hook on one link receiving the end bar on the adjacent link, means for feeding the strip through the machine, means for forming a link from the strip with the hook open and with the open part thereof facing in the direction from which the strip is being fed, and a rotating die and means moving in cooperation therewith adapted to fold said hook over the end bar of the following link and to feed the connected links forwardly.

11. In a machine for converting a strip of metal into a chain, each link of which comprises a hook at one end and an end bar at the other end, the hook on one link receiving the end bar on the adjacent link, means for feeding the strip through the machine, means for forming a link from the strip with the hook open and with the open part thereof facing in the direction from which the strip is being fed, and rotating dies disposed on opposite sides of the links and adapted to fold said hook over the end bar of the following link.

12. In a machine for converting a strip of metal into a chain, each link of which comprises a hook at one end and an end bar at the other end, the hook on one link receiving the end bar on the adjacent link, means for feeding the strip through the machine, means for forming a link from the strip with the hook open and with the open part thereof facing in the direction from which the strip is being fed, and rotating dies disposed on opposite sides of the links, said dies having cooperating recesses adapted to receive said hook and fold it over the end bar of the following link.

13. In a machine for converting a strip of metal into a chain, each link of which comprises a hook at one end and an end bar at the other end, the hook on one link receiving the end bar on the adjacent link, means for feeding the strip through the machine, means for forming a link from the strip with the hook open and with the open part thereof facing in the direction from which the strip is being fed, and rotating dies disposed on opposite sides of the links, said dies having cooperating recesses adapted to receive said hook and fold it over the end bar of the following link, one of said recesses having a spacing mandrel therein adapted to engage one end of said hook.

14. In a machine for converting a strip of metal into a chain, each link of which comprises a hook at one end and an end bar at the other end, the hook on one link receiving the end bar on the adjacent link, means for feeding the strip through the machine, means for forming a link from the strip with the hook open and with the open part thereof facing in the direction from which the strip is being fed, and means adapted to fold said hook over the end bar of the following link.

15. In a machine for converting a strip of metal into a chain, each link of which comprises a hook at one end and an end bar at the other end, the hook on one link receiving the end bar on the adjacent link, means for feeding the strip through the machine, and means for forming a link from the strip with the hook open and with the open part thereof facing in the direction from which the strip is being fed, said link-forming means comprising a rotating die having a plurality of radially disposed knives.

16. In a machine for converting a strip of metal into a chain, each link of which comprises a hook at one end and an end bar at the other end, the hook on one link receiving the end bar on the adjacent link, means for feeding the strip through the machine, and means for forming a link from the strip with the hook open and with the open part thereof facing in the direction from which the strip is being fed, said link-forming means comprising a rotating die having a plurality of radially disposed knives, each of said knives having a crimping surface adapted to bend part of said hook into the space between the knife acting on the strip and the next knife in front thereof.

17. In a machine for converting a strip of metal into a chain, each link of which comprises a hook at one end and an end bar at the other end, a plurality of rotating cutting dies adapted to sever the link blanks from the strip, other rotating dies adapted to bend the hook of one link over the end bar of an adjacent link, a guide disposed between said dies, and means to feed the severed blanks along said guide.

18. In a machine for converting a strip of metal into a chain, each link of which comprises a hook at one end and an end bar at the other end, a plurality of rotating cutting dies adapted to sever the link blanks from the strip, other rotating dies adapted to bend the hook of one link over the end bar of an adjacent link, a guide disposed between said dies, and means to feed the severed blanks along said guide, said feeding means also forming said cutting means.

19. In a machine for making sprocket chain from a strip of metal, working elements disposed on opposite sides of the strip and adapted to engage therewith, at least some of said elements having means to perform link-forming operations on said strip, other elements having means to connect the formed links into a chain, and means to impart motion to all of said elements lengthwise of the strip during said operations.

20. In a machine for making sprocket chain from a strip of metal, working elements disposed adjacent the strip of metal as it passes through the machine and adapted to engage therewith, said elements having means to perform link-forming operations on said strip, other elements having means to connect the formed links into a chain, and means to impart motion to all of said elements lengthwise of the strip during said operations.

21. In a machine of the character described, plurality of spaced apart sets of rolls, each set consisting of an upper and a lower rotatable die spaced apart to allow passage of a strip of metal, and means for rotating all of said dies to feed said strip.

22. In a machine of the character described, a plurality of spaced apart sets of rolls, each consisting of an upper and a lower rotatable die spaced apart to allow passage of a strip of metal, means for rotating all of said dies to feed said strip, and means for adjusting at least one die around its axis to slightly advance or retard it to synchronize the operations in the machine performed by the other dies.

Signed at Bridgeport, in the county of Fairfield, and State of Connecticut, this 6th day of January, A. D. 1922.

CHARLES PARKER.